US008826267B2

(12) United States Patent
Kumar

(10) Patent No.: US 8,826,267 B2
(45) Date of Patent: Sep. 2, 2014

(54) ASSOCIATION OF OBJECT ELEMENTS TO OPERATIONAL MODES

(75) Inventor: Ashish Kumar, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1281 days.

(21) Appl. No.: 12/608,980

(22) Filed: Oct. 29, 2009

(65) Prior Publication Data
US 2011/0107324 A1    May 5, 2011

(51) Int. Cl.
*G06F 9/45*       (2006.01)

(52) U.S. Cl.
USPC .......................................... 717/174; 717/122

(58) Field of Classification Search
None
See application file for complete search history.

(56) References Cited

U.S. PATENT DOCUMENTS

| | | | |
|---|---|---|---|
| 2005/0198628 A1* | 9/2005 | Graham et al. | 717/174 |
| 2006/0259904 A1* | 11/2006 | Celli et al. | 717/174 |
| 2007/0266133 A1* | 11/2007 | Bukovec et al. | 709/223 |
| 2007/0288918 A1* | 12/2007 | Gouge et al. | 717/174 |
| 2008/0148248 A1* | 6/2008 | Volkmer et al. | 717/168 |

OTHER PUBLICATIONS

Oracle Applications Multiple Organizations Implementation Guide, Release 12, Apr. 2007; 62 pages.

* cited by examiner

*Primary Examiner* — Elias Mamo
(74) *Attorney, Agent, or Firm* — Trellis IP Law Group, PC

(57) ABSTRACT

A method characterized by association of object elements to operational modes is adapted for use during installation or runtime of a software package. In an example embodiment, the software package includes objects and object behaviors, wherein a particular object has at least two different object behaviors associated with the particular object, and wherein different object behaviors are each associated with a different operational mode. The example method includes accepting a signal from a user input device to specify an operational mode in a target system for the software package and determining an object behavior that is associated with the specified operational mode. In one implementation, the determined behavior is installed in the target system while at least one other object behavior that is not associated with the specified operational mode is not installed in the target system. In another implementation, the software package is run via the target system, where the software package implements the determined behavior and does not implement at lease one other object behavior that is not associated with the specified operational mode.

8 Claims, 6 Drawing Sheets

User Interface Screen 2 ⟵120

| Obj. 1: Validations and Business Rules (Example) | Modes of Operation ⟵122 | | | |
|---|---|---|---|---|
| | Creation | Updation | Migration | Replication |
| Creation of LE must automatically create a Default LRU | ✓ | | | |
| Generation of Primary Key | ✓ | | ✓ | |
| There must exist a main LRU in the system | ✓ | ✓ | | |
| Start Date must be greater than Sysdate | ✓ | ✓ | | |
| Newer TIN numbers must be 10 digits. | ✓ | | | |
| LRUs cannot be created for an inactive LE | ✓ | | | |
| An inactive LRU cannot be registered | ✓ | | | |
| Populate newly added attribute if not already populated | | ✓ | ✓ | ✓ |

FIG. 4

ASSOCIATION OF OBJECT ELEMENTS TO OPERATIONAL MODES

BACKGROUND

This application relates in general to computing applications and more specifically to systems and methods for enabling end users to control or modify software behavior and functionality.

Systems and method for facilitating end user control over software behavior and functionality are employed in various applications, including software installation modules, database design packages, and so on. Such applications often demand user friendly versatile methods that facilitate improving software behavior and resource usage for different applications.

Conventionally, user friendly end user control over software behavior is often limited to selection of software components to install, creation of database architectures, and so on. Typically, more detailed changes to software behavior and functionality may require reprogramming of software components, which is often prohibitively time consuming and costly for practical end user modifications or customizations.

A given software application may include various components, such as objects, which contain different groups of rules, data, software methods or functions, and so on. Software written via an Object-Oriented Programming (OOP) language, such as C++, may include well-defined objects representing data structures that may contain one or more data fields, methods, and behavioral specifications. The term "object" as used herein may further include any grouping of or portion of data or functionality and may include behavioral logic, rules and conditions, information specifying operational modes applicable to the object, and so on. Certain objects may be identified by portions of computer code corresponding to the grouping.

Unfortunately, existing systems and methods for facilitating control over software behavior often lack functionality to facilitate user friendly end user control over the behavior of various objects included in a software application. This may result in inefficient use of computing resources due to resulting software conflicts, unused functionality, implementation of components that are inapplicable for a given application or operational mode, and so on.

SUMMARY

An example method capable of associating object elements to operational modes is adapted for use during installation or runtime of a software package. In the present example embodiment, the software package includes objects and object behaviors, wherein a particular object has at least two different object behaviors associated with the particular object, and wherein different object behaviors are each associated with a different operational mode. The example method includes accepting a signal from a user input device to specify an operational mode in a target system for the software package; determining an object behavior that is associated with the specified operational mode; and installing the determined behavior in the target system while omitting installing of at least one other object behavior that is not associated with the specified operational mode or otherwise running the software package via the target system, where the software package implements the determined behavior and does not implement at lease one other object behavior that is not associated with the specified operational mode An alternative method includes determining an association between a first behavior element of a software object and a first software operational mode and providing a signal in response thereto and then providing a first user option to alter the association.

In a more specific embodiment, the alternative method includes providing a second user option to create a new operational mode and providing a third user option to associate the new operational mode with the first behavior element. A fourth user option facilitates associating a second behavior element of said software object with the first software operational mode. A fifth user option facilitates associating the second behavior element with plural software operational modes. A sixth user option facilitates associating a second software operational mode with the first behavior element. A seventh user option facilitates disassociating the first software behavior element with the first software operational mode. The method further includes determining a second behavior element of the software object that is not applicable to an operational mode to be executed and uninstalling the second behavior element in response thereto.

A second alternative method includes determining an object behavior and then declaratively associating the object behavior with a predetermined mode not specified by the original object associated with the object behavior.

The novel design of certain embodiments disclosed herein is facilitated by enabling disassociation of object behaviors from software operational modes and enabling end users to adjust what object behaviors or other sections of code apply to what operational modes. This yields several benefits.

For example, by enabling an end user to associate portions of code, such as objects or portions thereof, with one or more desired operational modes, the overall applicability of the software to the application at hand may be improved. This may further improve software resource usage and efficiency and may reduce software conflicts.

In many existing software packages, various portions of code, such as objects, involving behavioral logic, validations, business rules are often pertinent to one operational flow, i.e., operational mode, and not to another. Conventionally, in absence of an embodiment disclosed herein, sometimes these objects conflict. At other times, the objects are substantially useless. For example, business rules applicable during a creation operational mode may not be applicable during data migration across various implementations, or during replication of data across various application instances that form part of the same implementation. However, the same set of objects may be brought into use for all these purposes, resulting in inefficient use of computing resources. Certain embodiments disclosed herein may facilitate eliminating these inefficiencies.

Previously, without use of an embodiment disclosed herein, object behavioral code is often intrinsically tied to the object itself, and not to the operational mode for which the object is intended to be used. Thus a method validation once enabled does not distinguish between create and migration flows, unless explicitly coded that way. However, use of certain embodiments disclosed herein may facilitate overcoming this problem by enabling an end user to disassociate a given operational mode from an object's behavioral code and then associate a desired operational mode with the behavioral code.

Use of certain embodiments disclosed herein may further facilitate software development. For example, separating behavior code driving logic, such as may correspond to an object, from operations that the behavior code is intended to perform, facilitates customizing associations between the behavior code and the corresponding operations. Consequently, this reduces the need for software developers to hard code behaviors in association with a specific operational mode, thereby facilitating software development.

With use of certain embodiments disclosed herein, a developer no longer needs to consider what object methods or behaviors might eventually remain useful for what operational flows and, in general, no longer needs to account for the end usage of the code while writing the code. Furthermore, introduction of new uses for an object may no longer require developers to revisit and retest their code.

A further understanding of the nature and the advantages of particular embodiments disclosed herein may be realized by reference of the remaining portions of the specification and the attached drawings.

BRIEF DESCRIPTION OF THE DRAWINGS

FIG. 4. is a diagram of a second example user interface screen that is adapted for use with the user interfaces of FIGS. 1 and 2.

DETAILED DESCRIPTION OF EMBODIMENTS

Although the description has been described with respect to particular embodiments thereof, these particular embodiments are merely illustrative, and not restrictive.

For clarity, certain well-known components, such as computers, hard drives, processors, operating systems, servers, databases, power supplies, and so on, have been omitted from certain figures. However, those skilled in the art with access to the present teachings will know which components to implement and how to implement them to meet the needs of a given application.

Figure 1:
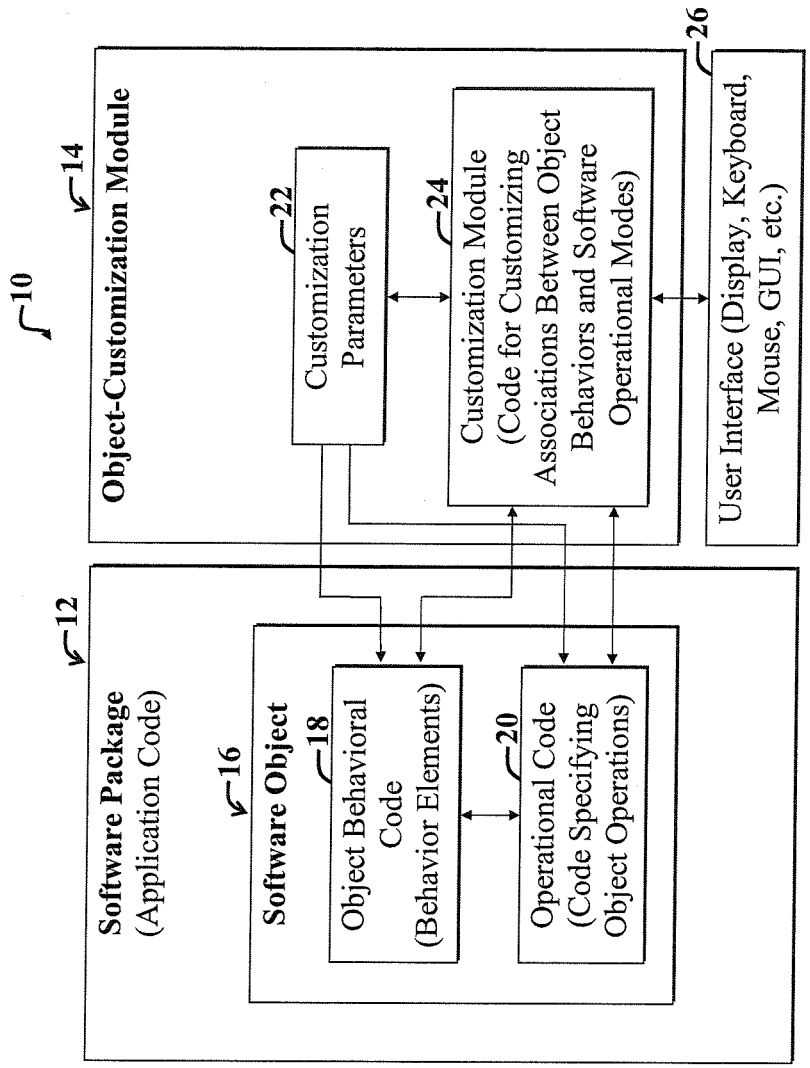
FIG. 1 is a diagram illustrating a first example embodiment of a system for associating object elements to software operational modes.

FIG. 1 is a diagram illustrating a first example embodiment of a system 10 for associating object elements 18 to software operational modes 20. The system 10 includes a software package 12 in communication with an object-customization module 14. The software package 12 includes code, i.e., computer readable instructions, defining a software object 16. The software object 16 includes object behavioral code 18, which includes behavior elements defining various behaviors, such as methods, associated with the object 18. The software object 16 further includes operational code 20, which may communicate with the object behavioral code 18. The software package 12 may be a pre-existing off-the-shelf software package, or the software package 12 may be particularly adapted for use with the object-customization module 14.

For the purposes of the present discussion, object elements may refer to any components or building blocks of an object. An object may be any group of components that are part of a similar data structure or that otherwise may be grouped by associations between the components or functionality of the components.

An object behavior may include any properties of an object that affect how the object itself is operated on or how the object operates on other components in a portion of software or may refer to the specification thereof. Certain object behaviors may be specified by a set of encoded logic and/or rules that specify how the object behaves under certain operating conditions, such as what methods, procedures, or functions are invoked, and so on. Object behavioral code may be any code used to specify one or more behaviors of an object.

An operational mode may correspond to an operative environment or operational flow associated with a software package or component thereof. The operative environment may include how the software is applied in a particular application or sequence of functions or operations. For example, one operational mode in a software package adapted to create a new database may operate in a database creation mode during use of the software package to create a new database. Operational code may be any code used to specify or define an operational mode for an object or for the entire software package 12 or other portions thereof. An operational mode and the specification thereof are employed interchangeably herein.

The object-customization module 14 includes a customization module 24 that communicates with a user interface 26 and user-modifiable customization parameters 22. The customization module 24 further communicates with the object behavioral code 18 and the operational code 20 of the software object 16 to facilitate modifications thereto. The modifications may include changing associations between behavior elements of the object behavioral code 18 and operational modes specified via the operational code 20. The customization parameters 22 generated by the customization module 24 may be input to the object behavioral code 18 and/or the operational code 20 as needed to facilitate modifications thereto. Customization parameters may include any code specifying changes to the software object 16, such as changes to associations between object behaviors and operational modes.

Note that the operational code 20 is shown included in the software object 16 by way of example. In practice, operational code or portions thereof may be maintained via the customization module 24 and the customization parameters 22. In cases where the software object 16 includes hard-coded operational code, the customization module 24 of the present example embodiment is adapted to change the operational code as needed in response to user input from the user interface 26. Note that a given operational mode of the overall software package 12 may be specified by mechanisms other than code, such as the operational code 20, included in one or more objects.

Operational modes for a given software package may vary among different software packages. The customization module 24 may be pre-loaded with information specifying the operational modes of the software package 12, or the operational modes may be established by a user. Alternatively, the customization module 24 may include code for automatically ascertaining preexisting operational modes of the software package 12, such as by reference to the operational code 20. Furthermore, the customization module 24 may include code adapted to enable a user to define new operational modes for the software package and/or one or more software objects 16 thereof.

In operation, the user interface 26, which may include a display, graphical user interface, keyboard, mouse, and so on, provides access to functionality provided by the customization module 24. Code for implementing a graphical user interface for display via the user interface 26 may be included in the customization module 24.

In an example operative scenario, a user employs the user interface 26 and the customization module 24 to determine one or more associations between object behaviors as specified via the object behavioral code and operational modes as specified by the operational code 20. The customization module 24 includes code for then providing a user option to change the associations via the user interface 26. The customization module 24 may further facilitate providing various additional user options, including a user option to declaratively associate one or more behaviors or behavioral elements 18 of the object 16 with one or more operational modes; to associate one or more of the specified operational modes with one or more of the object behaviors and then install the one or more object behaviors in response thereto; to construct a new type of object; to associate a group of operational modes to an object, where group of operational modes is said to be assigned to an object if each operational mode therein is associated with one or more behavior elements of the object; to assign a group of operational modes to a group of object behaviors; to define one or more object behaviors; to assign one or more new object behaviors to one or more predetermined operational modes; to specify one or more new operational modes; to associate a new operational mode with a given behavior element; to associate a second behavior element of the software object 16 with a first software operational mode; to associate the second behavior element with plural software operational modes; to associate a second software operational mode with a first behavior element; to disassociate the first software behavior element with the first software operational mode; to remove or uninstall a behavior element of the software object that is not applicable to an operational mode to be executed; and so on.

In a preferred embodiment, a user employs functionality of the user interface 26 and the customization module 24, as identified above, at runtime of the software package 12 or before running the software package 12, to selectively affect the operation or implementation of the software package 12. Alternatively, the functionality implemented via the user interface 26 and customization module 24 is employed during installation of the software package 12 to selectively affect installed associations between object behaviors and operational modes.

For the purposes of the present discussion, a group of operational modes or behaviors may be any set of operational modes or behaviors that share similar associations or categorizations. What constitutes a group may be user definable. For example, a user may assign different operational modes to different groups by merely assigning the modes to the groups, thereby establishing an association between the modes and the group.

Figure 2:
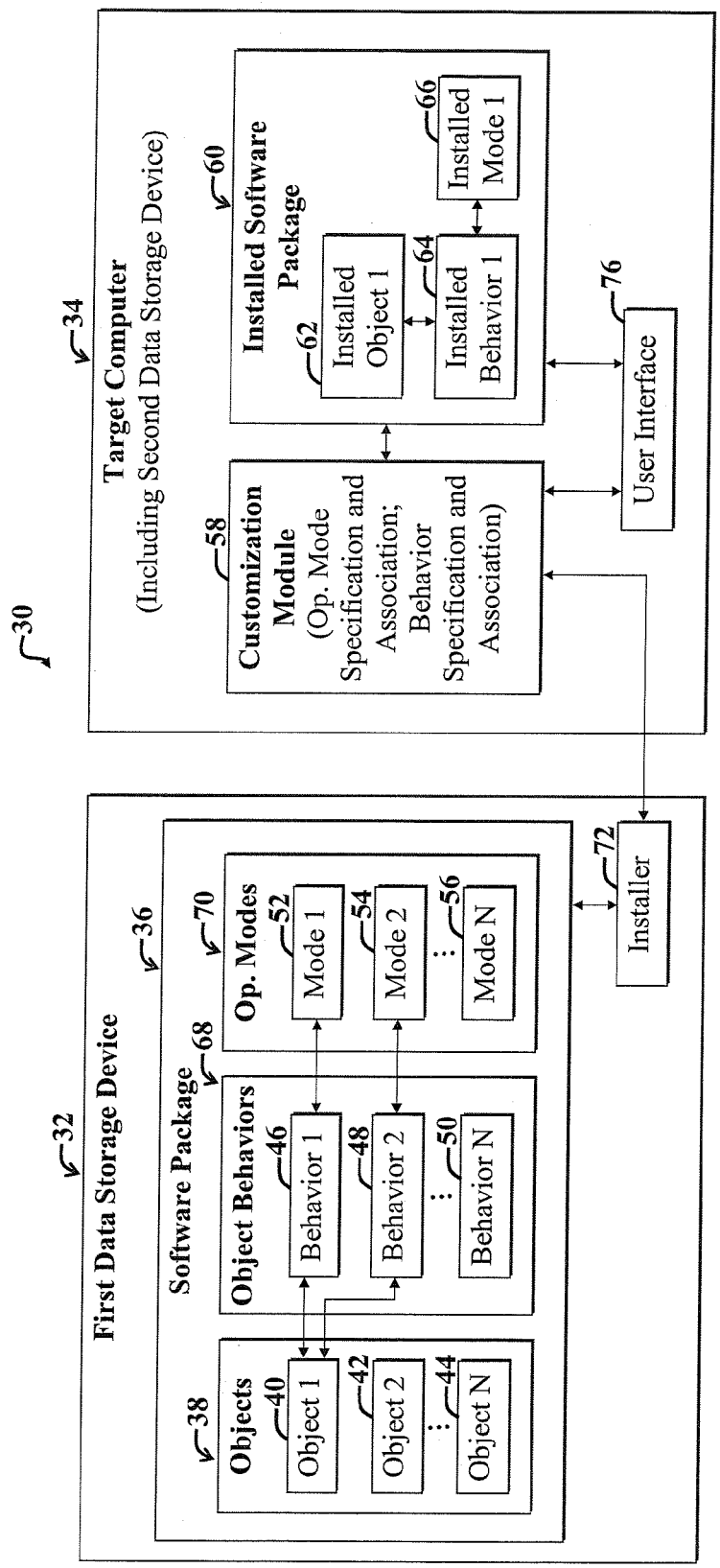
FIG. 2 is a more detailed diagram of a second example embodiment that is further adapted to enable software customization during an installation process by enabling end user control over associations between object behavior elements to software operational modes.

FIG. 2 is a more detailed diagram of a second example embodiment 30 that is further adapted to enable software customization during an installation process by enabling end-user control over associations between object behavior elements to software operational modes. The system 30 includes a first data storage device 32 in communication with a target computer 34 on which a software package 36 of the first data storage device 32 is to be installed.

The first data storage device 32 includes the software package 36, which includes plural objects 38, object behaviors 68, and operational modes 70. The objects 38 include N objects, including a first object 40, a second object 42, and an Nth object 44. Similarly, the object behaviors 68 include a first object behavior 46, a second object behavior 48, and an Nth object behavior 50. The operational modes 70 include a first mode 52, a second mode 54, and an Nth mode 56.

Note that while the software package 36 is shown including N objects 38, N object behaviors 68, and N operational modes 70, different numbers of objects, object behaviors, and operational modes may be employed, and the number of objects need not be equal to the number of object behaviors or operational modes. Similarly, the number of object behaviors 68 need not correspond to the number of operational modes 70 or the number of objects 38.

In the present example embodiment, the first data storage device 32 further includes and installer module 72, which includes instructions for selectively installing the software package 36 on the target computer 34 in response to a signal from a customization module 58 running on the target computer 34.

For illustrative purposes, the first object 40 is shown associated with a first behavior 46 and a second behavior 48. The first behavior 46 is associated with a first mode 52, and the second behavior 48 is associated with a second mode 54. In different applications, different associations between objects, behaviors, and modes may exist. For example, the first object 40 may be further associated with the Nth behavior 50, or the first behavior 46 may be associated with both the first mode and the second mode 54. For the purposes of the present discussion, an object is said to be associated with a behavior if code or instructions included in the object 40 support the behavior. Similarly, a behavior is said to be associated with an operational mode if the operational mode may be supported by, enabled by, or otherwise activated in response to the behavior or vice versa.

For illustrative purposes, the objects 38 are shown grouped separately from object behaviors 68. However, various behaviors 68 and code specifying operational modes 70 may be included in a similar section of code or data structure defining a given object. Certain embodiments disclosed herein may effectively separate object behaviors and operational modes from a given object to facilitate changing associations therebetween.

Note that while the software package 36 to be installed is shown on a separate device from the customization module 58, the software package 36 and the customization module may be located on the same computer and data storage device without departing from the scope of the present teachings.

In operation, the customization module 58 runs instructions, where the instructions accept a signal from a user input device, i.e., the user interface 76, to specify an operational mode, such as the first mode 52, in the target system 34 for the software package 36. The customization module 58 further includes computer code, i.e., instructions, for determining an object behavior, such as the first behavior 46, that is associated with the specified operational mode 52, and for installing the determined behavior 46 in the target system 34 while omitting installing of at least one other object behavior, such as the second behavior 48, that is not associated with the specified operational mode 52.

Alternatively or in addition, the customization module 58 includes instructions for enabling running of the software package 60 via the target computer 34, where the software package 60 implements the determined behavior 64 and does not implement at least one other object behavior 48 that is not associated with the specified operational mode 66. Such selective runtime implementation may occur regardless of whether the second behavior 48 has already been installed in the software package 60.

The resulting installed software package 60 is shown lacking the second behavior 48 from the software package 36, as the user may have determined that the second behavior 48 is unnecessary. The resulting installed software package 60 on the target computer 34 includes an installed object 62 corresponding to the first object 40 of the original software package 36; an installed behavior 64 corresponding to the first behavior 46; and an installed operational mode 66 corresponding to the first mode 52. The installed software package 60 lacks a behavior corresponding to the first behavior 48.

Note that by selectively omitting installation of the second behavior 48 on the target computer 34, the user has selectively disassociated the second behavior 48 from the first the first object 40, which corresponds to the installed object 62 on the target computer 34.

As discussed with reference to FIG. 1, the customization module 58 may further enable a user, via the user interface 76, to perform various operations affecting the objects 38 and associations between the objects, the object behaviors 68, and the operational modes 70. Such options include, but are not limited to a user option to declaratively associate one or more behaviors or behavioral elements 68 of the objects 38 with one or more operational modes 70; to associate one or more of the specified operational modes 70 with one or more of the object behaviors 68 and to install the one or more object behaviors in response thereto; to construct a new type of object; to associate a group of operational modes to an object, and so on, in advance of installing the software package 36 on the target computer 34. Such new associations, behaviors, modes, and so on may be implemented during installation of the software package 36. Alternatively, the installed software package 60 may be readily modified via the customization module 58 after installation, such as via a simple user interface, as discussed more fully below.

The customization module 58 is adapted to facilitate enabling a user to (or otherwise automatically) declaratively associate one or more object behaviors 68 or elements thereof with one or more operational modes 70 (which may include new user-defined operational modes) to provide a clean operational flow along with a more flexible coding mechanism. The customization module 58 and user interface 76 further provide an end user with flexibility to define their own modes of operation and to associate the code elements to the modes of operation as desired. For the purposes of the present discussion, a code element may include any section or component of computer-readable code, such as a function, procedure, or statement thereof. Computer-readable code, simply called "code" herein, may be any software or hardware instruction or collection of instructions.

In an example development operative scenario, a developer may first create an object, writing the corresponding code based on any and all requirements, and then enabling the code for certain operations or operational modes. Although embodiments may be particularly applicable to certain operational modes and corresponding object behaviors, such as those existing during a validation operational mode for a database application, embodiments discussed herein are readily extendable to any code component or portion of logic, validation, business rules, and so on, that can apply in different ways to different situations or operational modes.

Figure 3:
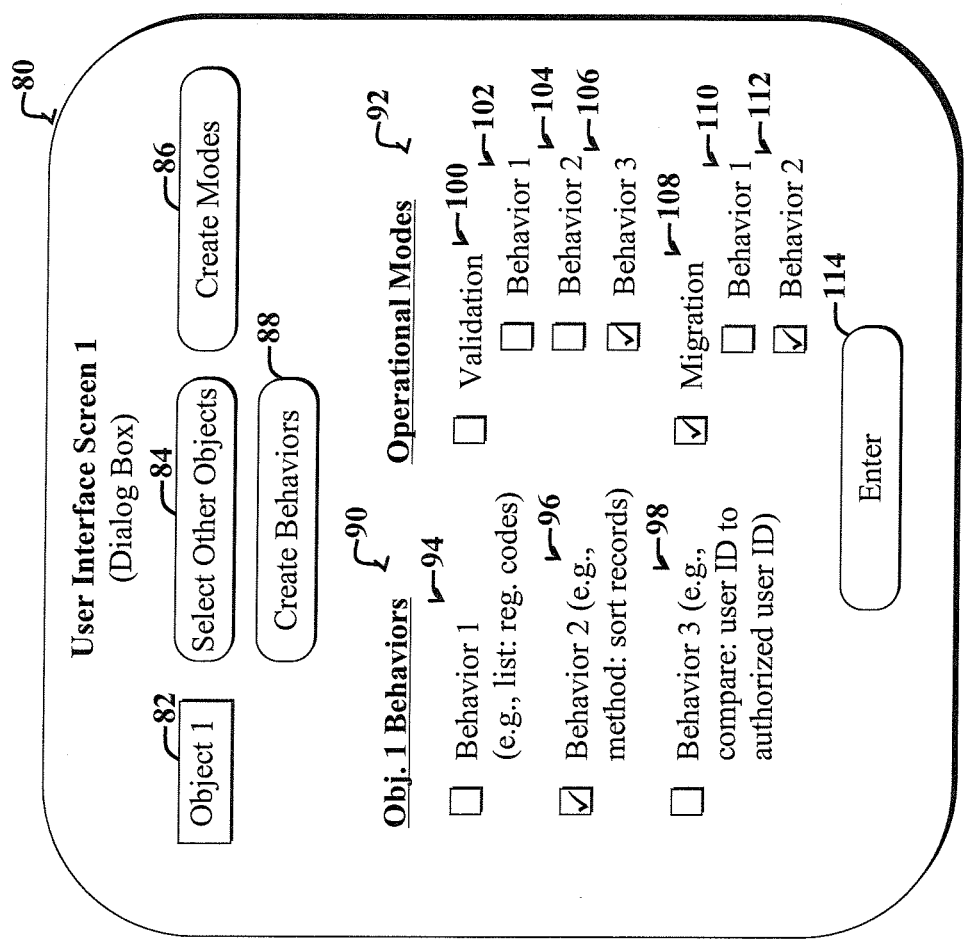
FIG. 3 is a diagram of a first example user interface screen that is adapted for use with the user interfaces of FIGS. 1 and 2.

FIG. 3 is a diagram of a first example user interface screen 80 adapted for use with the user interfaces 26, 76 of FIGS. 1 and 2. The example user interface screen 80 corresponds to a dialog box pertaining to a first object 82. Other objects may be selected for similar modifications via a select-other-objects button 84.

The screen 80 includes various user options, as represented by various buttons 82-88 and checkboxes 90-112 therein. The screen 80 lists various behaviors 90 corresponding to the first object 82. For illustrative purposes, a behaviors list 90 is shown including a first behavior checkbox 94, which may correspond, for example, to listing registration codes for registrants in a software-validation mode; a second behavior checkbox 96, which may correspond, for example, to a method for sorting records of a database; and a third behavior checkbox 98, which may correspond, for example, to a method for comparing a user identification number to a list of authorized identification numbers. In the present example user interface screen 80, the second behavior checkbox 96 is selected. Accordingly, the first behavior 94 and the third behavior 98 will not be associated with the first object 82 and may be effectively purged therefrom.

A list of operational modes 92 includes a validation checkbox 100 corresponding to a validation operational mode, which includes a first sub-checkbox 102 corresponding to the first behavior; a second sub-checkbox 104 corresponding to the second behavior; and a third checkbox 106 corresponding to the third behavior 98. Note that although the third sub-checkbox 106 is selected under the validation checkbox 100, the validation checkbox 100 is not checked. Accordingly, the third behavior 98 will not be employed in the first object 82 for validation, and the first object 82 will not be employed in an operational mode corresponding to validation.

The operational modes 92 include a migration checkbox 108 corresponding to a migration operational mode. The migration check box 108 includes a fourth sub-checkbox 110 corresponding to the first behavior 94 and a fifth sub-checkbox 112 corresponding to the second behavior 96. Note that the migration checkbox 108 is selected in the present example. Furthermore, the fifth sub-check box 112 corresponding to the second behavior 96 is selected. Accordingly, since the second behavior check box 96 of the object behaviors 90 is selected, and both the migration checkbox 108 and the sub-checkbox 112 corresponding to the second behavior 96 are selected, the object 82 will then be associated with and may contain code for implementing the second behavior 96 during a migration mode of operation.

Using this example interface, a user may associate one or more behaviors with a single object, including groups of behaviors; may associate one or more operational modes with one or more behaviors or groups thereof; may associated one or more operational modes with an object, and so on. Note that the layout of the example user-interface screen 80 is application specific and may readily be changed or altered to support various functionality disclosed herein without departing from the scope of the present teachings.

Furthermore, the screen 80 provides a create-behaviors button 88 that represents a user option for enabling a user to define additional behaviors to be associated with an object. Note that upon selection of the create-behaviors button 88 another dialog box may appear with appropriate functionality to enable a user to specify or otherwise define a behavior for a given object. Those skilled in the art with access to the present teachings may readily implement such functionality without undue experimentation.

Furthermore, a create-modes button 86 represents a user option enabling a user to create and specify additional operational modes for association with a given object, such as the first object 82. Note that another dialog box may appear with appropriate functionality to enable a user to specify or otherwise define a new operational mode for a given object. Those skilled in the art with access to the present teachings may readily implement such functionality without undue experimentation. The create-modes button 86 is shown in the screen 80 for illustrative purposes. Note that in practice, creation of modes may occur in a previous screen, such as a screen used to access the screen 80. Those skilled in the art will appreciate that creation of modes need not occur within the context of a particular object, such as the first object 82. Furthermore, functionality implemented via the screen 80 may be distributed among multiple screens or dialog boxes without departing from the scope of the present teachings.

After the user has made appropriate customization selections via the screen 80, the user may select an enter button 114. Selecting the enter button 114 may initiate installation of a software package containing, for example, the first object 82 with the behaviors and operational modes as specified via the screen 80. Alternatively, when not in installation mode, the selection of the enter button 114 may act to modify or otherwise implement the object 82 in software that has already been substantially installed, where the resulting modified or customized implementation includes the associations as specified via the screen 80.

In a preferred embodiment, functionality afforded by the screen 80 is employed by a user at runtime or before running of a software package containing, for example, the first object 82. This enables, for example, a user to selectively affect associations between object behaviors and operational modes employed by a given runtime instance of the underlying software package regardless of whether preexisting associations between object behaviors and operational modes have been previously installed.

FIG. 4. is a diagram of a second example user interface screen 120 adapted for use with the user interfaces 26, 76 of FIGS. 1 and 2. Note that the user interface screens 80, 120 of FIGS. 3 and 4 may be implemented, in part, via one of the customization modules 24 or 58 of FIG. 1 or 2, respectively.

The second user interface screen 120 includes a modifiable table 122, where a user can select various modes of operation, which are listed in the four right-most columns, for behaviors that are listed in the left column, for a particular object. In the present example, the object (Obj. 1) is a so-called "Validations and Business Rules" object. Note that object names are application specific and may widely vary between objects and software applications.

The example behaviors include creation of a database record or field corresponding to a Lead Engineer (LE), where the creation of the LE record or field automatically triggers creation of a corresponding Line Replacement Unit (LRU). This example behavior is listed in the left column as the first behavior. In the present example embodiment, this object behavior is enabled to function during a creation operational mode, as illustrated by a corresponding check under a "Creation" heading in the table 122.

A second example behavior includes generation of a primary database key. This behavior is shown as the second behavior in the table 122 in the left most column. The example object is enabled for facilitating creating a primary database key during creation and migration modes of operation, as illustrated by corresponding checks under the "Creation" and "Migration" headings in the table 122.

A third example behavior (listed third in the left most column) includes checking a condition, where the condition maintains that there must exist a main LRU in the system for the operational flow to proceed. This example behavior is shown enabled for creation and updation modes of operation, as illustrated by corresponding checks under the "Creation" and "Updation" headings in the table 122.

A fourth example behavior (listed fourth in the left most column) includes checking a condition, where the condition maintains that the start date must be greater than the system date (Sysdate) for the operational flow to proceed. This mode of operation is enabled for creation and updation modes of operation as shown in the table 122

Additional example behaviors and associations with operational modes are as depicted in FIG. 4. Note that checking or un-checking various fields corresponding to different modes of operation, a user may alter associations or assignments between behaviors of an object, thereby affecting or controlling which behaviors are active during which operational modes. Such specifications can be used, for example, to affect installation of software or to modify software once it has been installed.

Example modes of operation for an example database application include, but are not limited to: creation, updation, deletion, validation, migration of data across implementations, duplication of data, archival of data, replication of data across cross-pillar instances, upgrading, customizing, testing, globalizing, localizing, installing, and so on. Note that definitions or specifications of operational modes can vary in granularity based on usability of code and desirability of implementation.

As an example, without use of the present embodiment, the validation and business rules object (Obj. 1) might automatically create an LRU when a record for an LE is created or migrated to another platform. However, if a given application does not require creation of an LRU upon creation or migration of an LE record, the resulting LRU(s) may be useless and may represent an inefficient use of computing resources. The present example embodiment enables a user to eliminate this inefficiency, for example, by deselecting the check box or field associated with the creation mode or migration mode of operation corresponding to the behavior that automatically creates an LRU upon creation of an LE record (first behavior in list).

Figure 5:
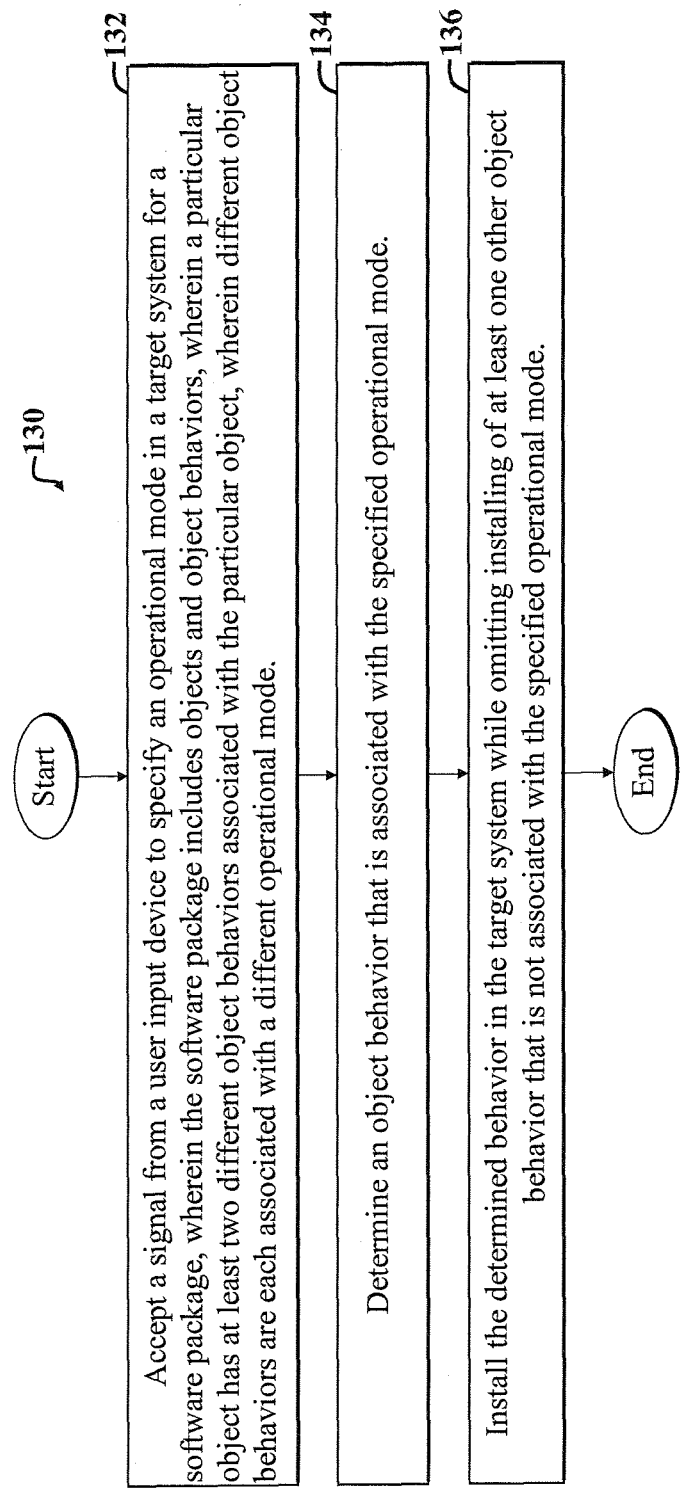
FIG. 5 is a flow diagram of a first example method adapted for use with the embodiment of FIG. 1.

FIG. 5 is a flow diagram of a first example method adapted for use with the embodiment of FIG. 1. The method 130 includes a first step 132, which includes accepting a signal from a user input device to specify an operational mode in a target system for a software package, wherein the software package includes objects and object behaviors, wherein a particular object has at least two different object behaviors associated with the particular object, wherein different object behaviors are each associated with a different operational mode.

A second step 134 includes determining an object behavior that is associated with the specified operational mode.

A third step 136 includes installing the determined behavior in the target system while omitting installing of at least one other object behavior that is not associated with the specified operational mode. In other embodiments, the act of installing the determined behavior may be performed at other times or in other situations such as when software or data is delivered or demonstrated.

Note that the method 130 may be adjusted, such as by adding, rearranging, omitting, or modifying steps, and so on, without departing from the scope of the present teachings. For example, the second step 134 may further include determining plural object behaviors that are associated with a given operational mode. In addition, the installation step 136 may be replaced with a code-modification step for software packages that have already been installed.

Figure 6:
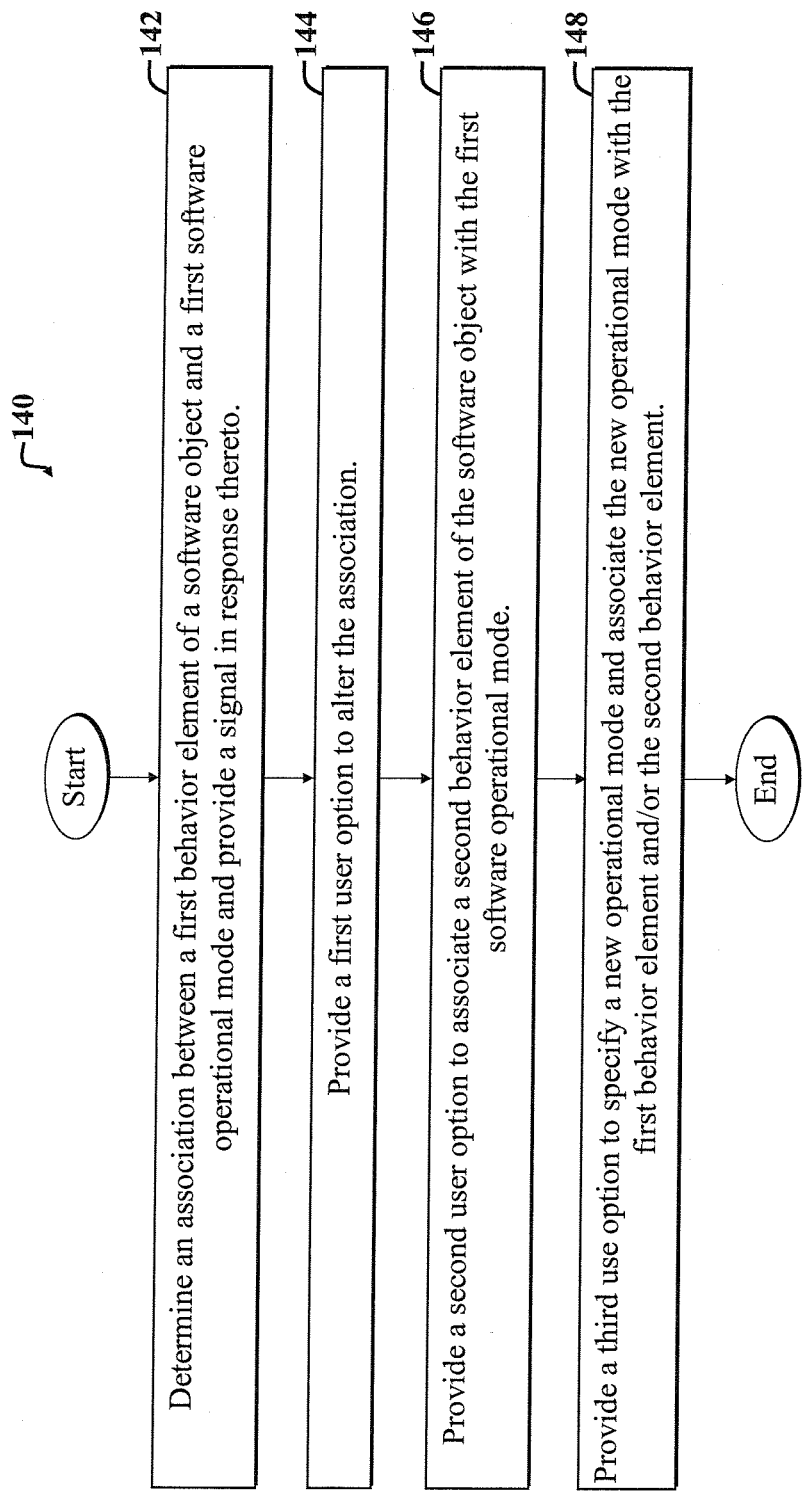
FIG. 6 is a flow diagram of a second example method adapted for use with the embodiments of FIGS. 1 and 2.

FIG. 6 is a flow diagram of a second example method 140 adapted for use with the embodiments of FIGS. 1 and 2. The example method 140 includes an initial determining step 142, which includes determining an association between a first behavior element of a software object and a first software operational mode and providing a signal in response thereto. In a preferred embodiment, the initial determining step 142 is performed at a runtime of software code that includes the software object.

A first providing step 144 includes providing a first user option to alter the association.

A second providing step 146 includes providing a second user option to associate a second behavior element of the software object with the first software operational mode.

A third providing step 148 includes providing a third use option to specify a new operational mode and to associate the new operational mode with the first behavior element and/or the second behavior element.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for installing a software package in a target system, wherein the software package includes objects and object behaviors, wherein a particular object has more than one object behavior associated with the particular object, the method comprising:
   displaying, in response to user input to a first user interface selecting a first object in the software package, a list of one or more object behaviors of the first object and a list of one or more operational modes, where an operational mode corresponds to an operational environment in which an object behavior may operate;
   associating, in response to user input to the first user interface, one or more selected object behaviors of the first object with a selected operational mode, where the selected operational mode corresponds to the operational environment of the target system;
   and
   installing an installed version of the software package in the target system where the installed version includes only the one or more selected object behaviors associated with the selected operational mode.

2. The method of claim 1 further including:
   constructing a new type of object in response to user input to the first user interface.

3. The method of claim 1 further including:
   associating a group of operational modes to an object in response to user input to the first user interface.

4. The method of claim 1 further including:
   assigning a group of operational modes to a group of object behaviors in response to user input to the first user interface.

5. The method of claim 1 further including:
   defining one or more object behaviors in response to user input to the first user interface.

6. The method of claim 1 further including:
   assigning one or more new object behaviors to one or more predetermined operational modes in response to user input to the first user interface.

7. An apparatus for installing a software package, wherein the software package includes objects and object behaviors, wherein a particular object has more than one object behavior associated with the particular object, the apparatus comprising:
   a processor coupled to a processor-readable storage device; and
   a display coupled to the processor;
   wherein the processor readable storage media includes instructions executable by the processor for:
      displaying, in response to user input to a first user interface selecting a first object in the software package, a list of one or more object behaviors of the first object and a list of one or more operational modes, where an operational mode corresponds to an operational environment in which an object behavior may operate;
      associating, in response to user input to the first user interface, one or more selected object behaviors of the first object with a selected operational mode, where the selected operational mode corresponds to the operational environment of the target system;
      and
      installing an installed version of the software package in the target system where the installed version includes only the one or more selected object behaviors associated with the selected operational mode.

8. A non-transitory processor-readable storage device including instructions executable by a processor for installing a software package, wherein the software package includes objects and object behaviors, wherein a particular object has more than one object behavior associated with the particular object, the non-transitory processor-readable storage device comprising instructions for:
- displaying, in response to user input to a first user interface selecting a first object in the software package, a list of one or more object behaviors of the first object and a list of one or more operational modes, where an operational mode corresponds to an operational environment in which an object behavior may operate;
- associating, in response to user input to the first user interface, one or more selected object behaviors of the first object with a selected operational mode, where the selected operational mode corresponds to the operational environment of the target system; and
- installing an installed version of the software package in the target system where the installed version includes only the one or more selected object behaviors associated with the selected operational mode.

* * * * *

UNITED STATES PATENT AND TRADEMARK OFFICE
CERTIFICATE OF CORRECTION

PATENT NO.         : 8,826,267 B2                                    Page 1 of 1
APPLICATION NO.    : 12/608980
DATED              : September 2, 2014
INVENTOR(S)        : Kumar It is certified that error appears in the above-identified patent and that said Letters Patent is hereby corrected as shown below:

On title page, column 2, item (57), under Abstract, line 18, delete "lease" and insert -- least --, therefor.

In the Specification

In column 1, line 66, delete "lease" and insert -- least --, therefor.

In column 1, line 67, delete "mode" and insert -- mode. --, therefor.

In column 10, line 6, delete "122" and insert -- 122. --, therefor.

Signed and Sealed this
Twenty-fourth Day of March, 2015

Michelle K. Lee
*Director of the United States Patent and Trademark Office*